United States Patent
Halder et al.

(10) Patent No.: US 9,335,773 B2
(45) Date of Patent: May 10, 2016

(54) VOLTAGE REGULATOR

(71) Applicant: Micronas GmbH, Freiburg (DE)

(72) Inventors: Samiran Halder, Munich (DE); Sergej Koschuch, Munich (DE)

(73) Assignee: Micronas GmbH, Freiburg (DE)

( * ) Notice: Subject to any disclaimer, the term of this patent is extended or adjusted under 35 U.S.C. 154(b) by 43 days.

(21) Appl. No.: 14/570,383

(22) Filed: Dec. 15, 2014

(65) Prior Publication Data

US 2015/0168967 A1 Jun. 18, 2015

(30) Foreign Application Priority Data

Dec. 13, 2013 (DE) .......................... 10 2013 020 577

(51) Int. Cl.
  *G05F 1/46* (2006.01)
  *H02M 3/157* (2006.01)
  *H02M 3/156* (2006.01)
  *H02M 1/00* (2006.01)

(52) U.S. Cl.
  CPC ................. *G05F 1/46* (2013.01); *H02M 3/156* (2013.01); *H02M 3/157* (2013.01); *H02M 2001/0003* (2013.01); *H02M 2001/0045* (2013.01)

(58) Field of Classification Search
  CPC ....................................................... G05F 1/46
  See application file for complete search history.

(56) References Cited

U.S. PATENT DOCUMENTS

| 6,150,798 | A | 11/2000 | Ferry et al. |
| 6,909,268 | B2 | 6/2005 | Taghizadeh-Kaschani |
| 7,253,596 | B2 | 8/2007 | Yamamoto et al. |
| 7,486,058 | B2 * | 2/2009 | Szepesi .................... G05F 1/577 323/272 |
| 7,609,039 | B2 | 10/2009 | Hasegawa |
| 7,990,119 | B2 * | 8/2011 | Petty ...................... H02M 3/156 323/268 |
| 8,810,214 | B2 * | 8/2014 | Van Dijk ................ H02M 3/158 323/266 |
| 8,823,341 | B2 * | 9/2014 | Polarouthu ............ H02M 3/156 323/265 |
| 2004/0012376 | A1 | 1/2004 | Taghizadeh-Kaschani |
| 2007/0057658 | A1 | 3/2007 | Hasegawa |
| 2009/0295344 | A1 * | 12/2009 | Qu ............................ G05F 1/56 323/265 |
| 2012/0119718 | A1 | 5/2012 | Song |
| 2013/0285631 | A1 | 10/2013 | Bisson et al. |
| 2015/0009719 | A1 * | 1/2015 | Ho .................... H02M 3/33507 363/21.13 |

FOREIGN PATENT DOCUMENTS

| DE | 100 43 482 A1 | 3/2002 |
| DE | 10 2013 207 939 A1 | 10/2013 |
| JP | H 11-164550 A | 6/1999 |
| JP | 2003-216254 A | 7/2003 |
| JP | 2005-130622 A | 5/2005 |
| JP | 2006-039861 A | 2/2006 |
| JP | 2007-082273 A | 3/2007 |
| JP | 2010-191870 A | 9/2010 |
| JP | 2012-016241 A | 1/2012 |

* cited by examiner

*Primary Examiner* — Emily P Pham
(74) *Attorney, Agent, or Firm* — Muncy, Geissler, Olds & Lowe, P.C.

(57) ABSTRACT

A voltage regulator, having a control element, having a current feedback circuit, having a negative voltage feedback circuit, having a component for switching between a first mode as a switching regulator and a second mode as a linear regulator and for generating a digital control signal for triggering the control element in the first mode as a switching regulator based on a sum variable, and for generating a linear control signal for triggering the control element in the second mode as a linear regulator based on the sum variable, whereby in the first mode as a switching regulator and in the second mode as a linear regulator, a first output of the current feedback circuit and a second output of the negative voltage feedback circuit are coupled to form the sum variable.

13 Claims, 3 Drawing Sheets

VOLTAGE REGULATOR

This nonprovisional application claims priority under 35 U.S.C. § 119(a) to German Patent Application No. 10 2013 020 577.8, which was filed in Germany on Dec. 13, 2013, and which is herein incorporated by reference.

BACKGROUND OF THE INVENTION

1. Field of the Invention

The present invention relates to a voltage regulator.

2. Description of the Background Art

The data sheet for the voltage regulator MAX5097 from MAXIM Integrated Products Inc. describes a prior-art solution in which to switch between a first mode as a switching regulator and a second mode as a linear regulator, a part of the internal regulator components is turned off or modified in order to adapt their compensation networks to operating parameters. This has far-reaching consequences for the load behavior and/or operational stability. Additional circuit components are required for changing the compensation networks, which increases the complexity and circuit area. In addition, the load behavior (current drain) and the voltage precision of the output are limited, because the modified control loop must start up first and stabilize completely. If the switching regulator is switched, for example, to a linear regulator, the switching occurs by turning off the current feedback through the driver multiplexer, driving the output transistor, and reconfiguring the voltage control from the GM amplifier to the LDO mode amplifier. This has a significant impact on the load behavior so that the load may even need to be separated during the switching process and subsequent stabilization of the reconfiguration.

U.S. Pat. No. 6,150,798 discloses a voltage regulator. A control circuit can select between a switching regulator component and a linear regulator component according to a voltage difference between the battery voltage and output voltage.

SUMMARY OF THE INVENTION

It is therefore an object of the invention to improve a voltage regulator.

Accordingly, in an embodiment, a voltage regulator is provided. The voltage regulator has a control element and a current feedback circuit and a negative voltage feedback circuit.

The voltage regulator can switch between a first mode as a switching regulator and a second mode as a linear regulator, can generate a digital control signal for triggering the control element in the first mode as a switching regulator based on a sum variable and can generate a linear control signal for triggering the control element in the second mode as a linear regulator based on the sum variable.

In the first mode as a switching regulator and in the second mode as a linear regulator, a first output of the current feedback circuit and a second output of the voltage feedback circuit are coupled to form the sum variable. The sum variable is, for example, a current sum or a voltage sum.

Tests by the applicant have shown that with this circuit architecture of the voltage regulator with coupled outputs of the current feedback and negative voltage feedback, the switching occurs without a significant jump in the output voltage. The regulator remains in the steady state.

The object of the invention furthermore is to provide an improved method for switching a voltage regulator.

Accordingly, a method is provided for switching a voltage regulator between a first mode as a switching regulator and a second mode as a linear regulator.

The method can have the following steps: generating a digital control signal for triggering a control element in the first mode based on a sum variable; switching between the first mode and the second mode; and generating a linear control signal for triggering the control element in the second mode as a linear regulator based on the sum variable.

In the first mode as a switching regulator and in the second mode as a linear regulator, a first output of a current feedback circuit and a second output of a negative voltage feedback circuit are coupled to form the sum variable.

The refinements described hereafter can relate to both the voltage regulator and the method for switching a voltage regulator.

According to an embodiment, for coupling, the first output of the current feedback circuit and the second output of the negative voltage feedback circuit are connected to a current summing node.

According to an embodiment, a first output current of the current feedback circuit and a second output current of the negative voltage feedback circuit are summed in the current summing node with an opposite sign.

According to an embodiment, the sum variable is a voltage that drops across a resistor. The resistor is connected in particular to the current summing node.

According to an embodiment, the current feedback circuit is formed to generate an output current, which depends on the current through the control element. In particular, the output current is proportional to the current through the control element.

According to an embodiment, the voltage regulator has a compensation network, whereby the compensation network is connected to the negative voltage feedback circuit.

According to an embodiment, the compensation network is connected to the current summing node.

According to an embodiment, an amplifier for amplifying the linear control signal is provided. Advantageously, a driver is provided for outputting the digital control signal. According to an advantageous refinement, the amplifier is connected to the driver.

According to an embodiment, the voltage regulator has a control circuit for triggering the switch to switch between the first mode and the second mode.

According to an embodiment, the control circuit is configured in the second mode as a linear regulator to switch the linear control signal via the driver to an input of the control element.

According to an embodiment, a circuit is provided for generating the digital control signal based on the sum variable.

The previously described refinement variants are especially advantageous both individually and in combination. In this regard, all refinement variants can be combined with one another. Some possible combinations are explained in the description of the exemplary embodiments shown in the figures. These possible combinations of the refinement variants, depicted therein, are not definitive, however.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
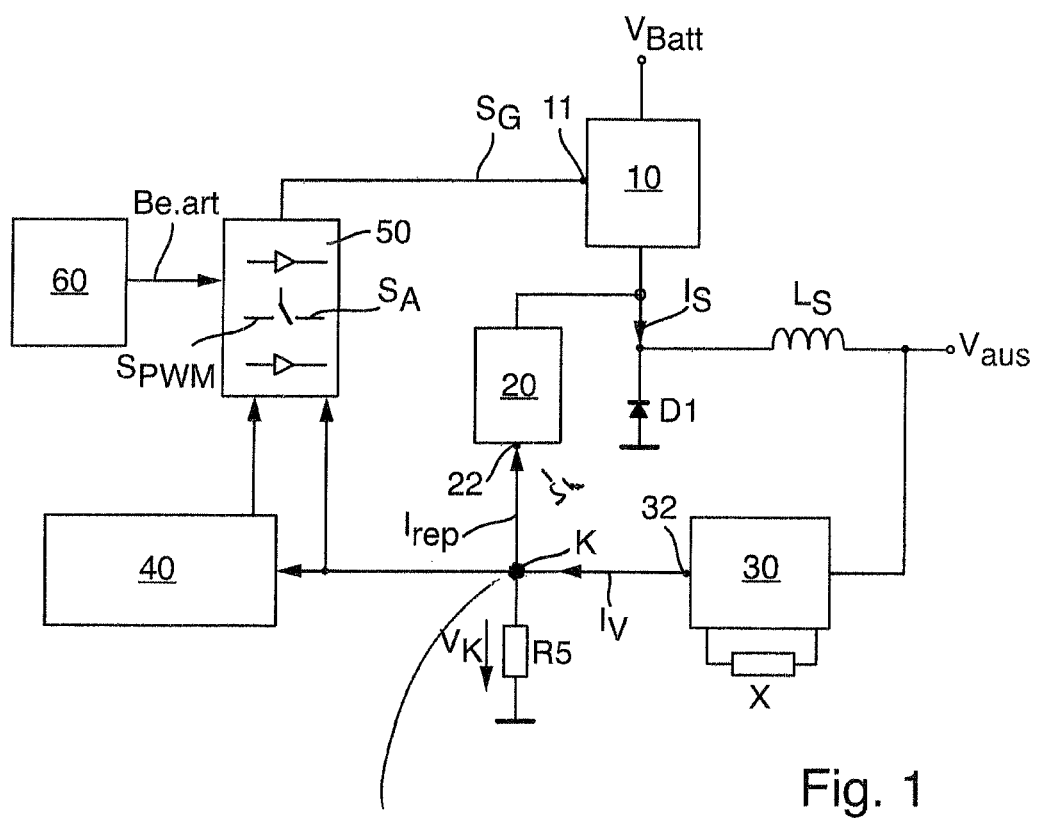
FIG. 1 is a schematic block circuit diagram.

FIG. 1 shows a block circuit diagram of a voltage regulator. The voltage regulator enables an interruption-free (continuous) switching of a step-down switching regulator to a linear regulator with retention of a current feedback 20 in a so-called "current mode controller."

In the switching between a first mode as a step-down switching regulator and a second mode as a linear regulator, the entire regulator remains active and all of its operational parameters constant. By nonintervention in the control loop, the regulator properties are retained in terms of operational stability and load behavior.

In FIG. 1, the actual buck converter comprises the elements 10, D1, and $L_S$. In this case, control element 10 is a semiconductor element such as, for example, a field-effect transistor, bipolar transistor, DMOS, or the like for controlling the current $I_S$. $L_S$ is a coil and D1 is a diode. Control element 10 receives its control signal $S_G$ which is based on a current feedback circuit 20, a so-called current-programmed or current-mode controller, which detects the coil current $I_S$ for the purpose of a local feedback. The outer control loop comprises a negative voltage feedback circuit 30, a so-called voltage controller, which corrects the required output voltage $V_{aus}$ at the load (not shown).

FIG. 1 thus shows a voltage regulator with a control element 10 and a current feedback circuit 20 and a negative voltage feedback circuit 30. Control element 10 is, for example, a transistor whose output is connected via a coil $L_S$ to the output of the voltage regulator to output the regulated voltage $V_{aus}$. In addition, control element 10 is connected to a supply with the supply voltage $V_{batt}$, for example, to a battery. Moreover, diode D1 is connected to coil $L_S$.

Current feedback circuit 20 at output 22 generates an output current $I_{rep}$, which depends on a current $I_S$ through control element 10 and coil $L_S$. In the embodiment of FIG. 1, output current $I_{rep}$ is proportional to current $I_S$ through control element 10.

The circuit according to the embodiment in FIG. 1 has a compensation network X, to prevent an overshoot or even an oscillation in the control loop. The compensation network is connected to negative voltage feedback circuit 30.

In an embodiment in FIG. 1, in the first mode as a switching regulator and in the second mode as a linear regulator, a first output 22 of current feedback circuit 20 and a second output 32 of negative voltage feedback circuit 30 are coupled to form a sum variable. For the coupling, outputs 22, 32 are connected to one another as shown in FIG. 1. Alternatively, outputs 22, 32 are connected to an adding circuit.

For the coupling, in the embodiment of FIG. 1, a first output 22 of current feedback circuit 20 and a second output 32 of negative voltage feedback circuit 30 are connected to a current summing node K. In current summing node K, output current $I_{rep}$ from first output 22 of current feedback circuit 20 and output current $I_V$ from second output 32 of negative voltage feedback circuit 30 are summed.

In this regard, output current $I_{rep}$ of current feedback circuit 20 and output current $I_V$ of negative voltage feedback circuit 30 are summed with a different sign. In the embodiment of FIG. 1, output current $I_V$ of negative voltage feedback circuit 30 with the negative sign is included in the current summation.

The sum variable is formed from the two output currents $I_{rep}$, $I_V$. The sum variable is formed by a voltage $V_K$, which drops across a resistor R5, whereby resistor R5 is also connected to current summing node K. In the embodiment of FIG. 1, the current through R5 is equal to $-I_{rep}+I_V$. The current through R5 thereby produces the voltage drop $V_K$, which forms the sum variable.

The circuit according to the embodiment in FIG. 1 has a circuit block 50 for switching between a first mode as a switching regulator and a second mode as a linear regulator. Circuit block 50 in this case outputs trigger signal $S_G$ to input 11 of control element 10. Trigger signal $S_G$ is, for example, the gate voltage of a field-effect transistor. Circuit block 50 in this case switches between a digital control signal $S_{PWM}$ for triggering control element 10 in the first mode as a switching regulator and a linear control signal $S_A$ for triggering control element 10 in the second mode as a linear regulator. For the switching, circuit block 50 has, for example, switching elements such as switching transistors or the like.

The circuit according to the embodiment in FIG. 1 has a circuit block 40 for generating the digital control signal $S_{PWM}$ based on the sum variable $V_K$. The digital control signal $S_{PWM}$ is, for example, a pulse width modulated signal, whose pulse width increases with an increasing sum variable $V_K$.

The circuit according to the embodiment in FIG. 1 has a component for generating the linear control signal $S_A$ based on the sum variable $V_K$. In the simplest case, the linear control signal $S_A$ corresponds to the sum variable $V_K$. In this case, the component is a simple connection.

However, an amplification and/or potential shift may be necessary. For example, circuit block 50 has an amplifier for amplifying the linear control signal $S_A$.

The circuit according to the embodiment in FIG. 1 has a control circuit 60 for triggering circuit block 50 to switch between the first mode and the second mode. To this end, control circuit 60 outputs a changeover signal Be.art.

Figure 2:
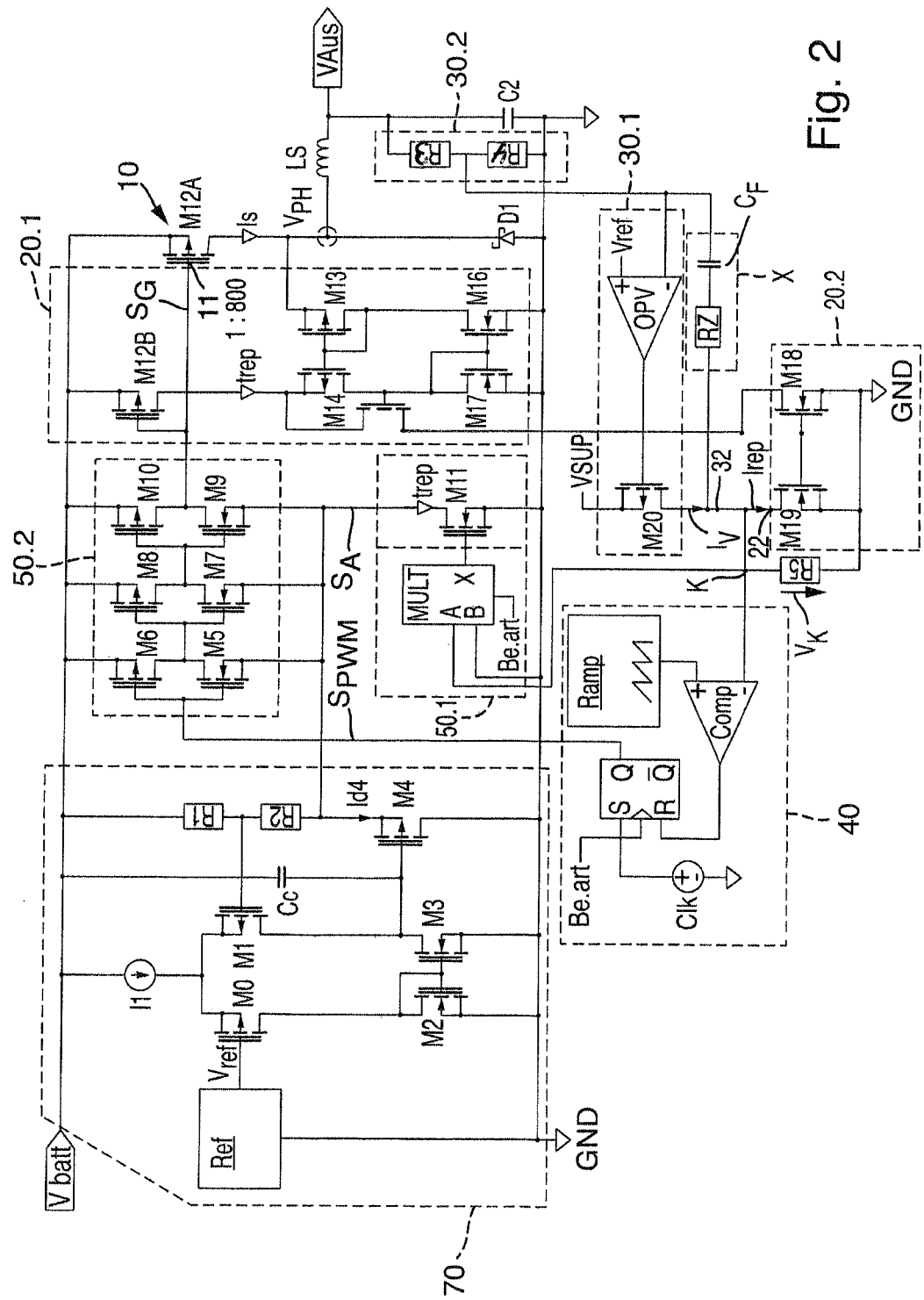
FIG. 2 is a schematic circuit diagram.

A circuit of a voltage regulator is shown schematically in FIG. 2. The circuit causes a run method that switches the voltage regulator from a first mode as a switching regulator to a second mode as a linear regulator. The method can have the steps of generating a digital control signal $S_{PWM}$ for triggering a control element M12A, for example, in the form of a field-effect transistor, in the first mode based on a sum variable $V_K$; switching between the first mode and the second mode; and generating a linear control signal $S_A$ for triggering the control element M12A in the second mode as a linear regulator based on the sum variable $V_K$.

In the first mode as a switching regulator and in the second mode as a linear regulator, a first output 22 of a current feedback circuit, formed of circuit blocks 20.1 and 20.2, and a second output 32 of a negative voltage feedback circuit, including circuit blocks 30.1 and 30.2, are coupled to form the sum variable $V_K$.

The switching occurs at a suitable circuit point of a defined circuit architecture, whereby there is no intervention in the control loop. (Almost) all circuit parts remain active and no higher function blocks are needed in addition.

A circuit architecture is used that carries out the switching in the linear operation and thereby leaves almost all circuit parts active.

The circuit according to the embodiment in FIG. 2 has substantially four function blocks:

(1) An internal voltage source 70 with the reference voltage source REF, with the current source 11, with the transistors M0 . . . M4, and with the resistors R1, R2, which provides a local reference voltage for a driver stage 50.2.

(2) Driver stage 50.2 (gate driver), which is made up of transistors M5 . . . M10. Driver stage 50.2 controls switching transistor M12A as control element M12A and a copier transistor M12B. In this case, driver 50.2 outputs the digital control signal $S_{PWM}$ to control element M12A. Copier transistor M12B is part of a current feedback circuit comprising circuit blocks 20.1 and 20.2, which can also be called a current control. The output current $I_{rep}$ and the coil current $I_S$ in the embodiment of FIG. 2 have a ratio of 1:800.

(3) The current feedback circuit by transistor M19 intervenes in the pulse width control of circuit block 40.

(4) A negative voltage feedback circuit comprising circuit blocks 30.1 and 30.2 can also be called a voltage control. The negative voltage feedback circuit is realized as a proportional-integral (PI) regulator by an operational amplifier OPV, compensated via CF, RZ, and compares the voltage, which is present at the inverting input and is based on the output signal $V_{aus}$, with the internal reference voltage $V_{ref}$ (control deviation). To this end, negative voltage feedback circuit 30.2 is connected to the output of the voltage regulator. Resistors R3, R4 divide the output voltage $V_{aus}$. A center tap of voltage divider 30.2 comprising R3, R4 is connected to the input of operational amplifier OPV. Transistor M20 in this case acts as a voltage-controlled current source, so that the output current $I_V$ at output 32 depends on the voltage comparison by operational amplifier OPV. In the embodiment in FIG. 2, resistor $R_Z$ and capacitor $C_F$ form a compensation network X, which assures control loop stability.

During operation as a switching regulator, output voltage $V_{aus}$ is controlled by digital control signal $S_{PWM}$, in the embodiment in FIG. 2 by the pulse duty ratio of a PWM signal (PWM: pulse width modulation) as a digital control signal $S_{PWM}$ at the input of driver stage 50.2. The digital control signal $S_{PWM}$ is thereby generated by comparator COMP in circuit block 40.

The embodiment of the voltage regulator according to FIG. 2 avoids intervention in the control loop and adds only two parts, a changeover switch MULT and a transistor M11. The switching to the linear operation occurs preferably by three simple (simultaneous) actions: the digital control signal $S_{PWM}$ at the output of the flip-flop FF is set permanently to logic one (high), as a result of which transistor M9 becomes a low-resistance switch; transistor M4 is turned off, so that resistors R1 and R2 function as a workload for transistor M11. The additional amplification through M11 is low; and transistor M11 is driven via changeover switch MULT directly by the sum variable $V_K$.

Transistor M11 acting as an amplifier is connected to driver 50.2. In the embodiment of FIG. 2, transistor M11 is connected directly to transistor M9. In the second mode as a linear regulator, the linear control signal $S_A$ is connected via the opened transistor M9 of driver 50.2 to an input 11 of control element M12A.

Output 22 of current feedback circuit 20.1, 20.2 and output 32 of negative voltage feedback circuit 30.1, 30.2, X in the embodiment of FIG. 2 are connected to node K. Both output currents $I_V$, $I_{rep}$ are summed in node K with a different sign. Likewise, a resistor R5 is connected to node K. Voltage $V_K$ between node K and a reference potential, particularly ground GND, is a sum variable, which is used both for the mode as a switching regulator and for the mode as a linear regulator, whereby both the digital control signal $S_{PWM}$ and the linear control signal $S_A$ are based on the voltage $V_K$.

The negative voltage feedback and the current feedback undergo no modification during the switching between the first mode (switching regulator) and the second mode (linear regulator). Because the three described actions have no time constants (apart from parasitic nodes), the switching occurs approximately jump-free, and the regulator remains in the steady state. Tests by the applicant have shown that transistor M11 is in fact amplified, but the amplification is reduced by the current feedback. The current feedback supports the stability, so that ultimately intervention in the negative voltage feedback is superfluous.

In comparison with the prior art, in the embodiment of FIG. 2, switching to linear operation is not achieved by switching the circuit environment of transistor M12B. The control loop need not be opened, because the current feedback is not turned off either. Likewise, the negative voltage feedback need not be modified for reasons of stability.

Simulations and measurements by the applicant show the efficiency of the voltage regulator during the switching between the two operating modes (linear, step-down switching).

During the switching from the mode as a linear regulator to the mode as a switching regulator, only an output voltage fluctuation of <40 $mV_{ss}$ is simulated under full load. During the switching from the mode as a switching regulator to the mode as a linear regulator, only an output voltage fluctuation of <140 $mV_{ss}$ is simulated under full load.

Figure 3:
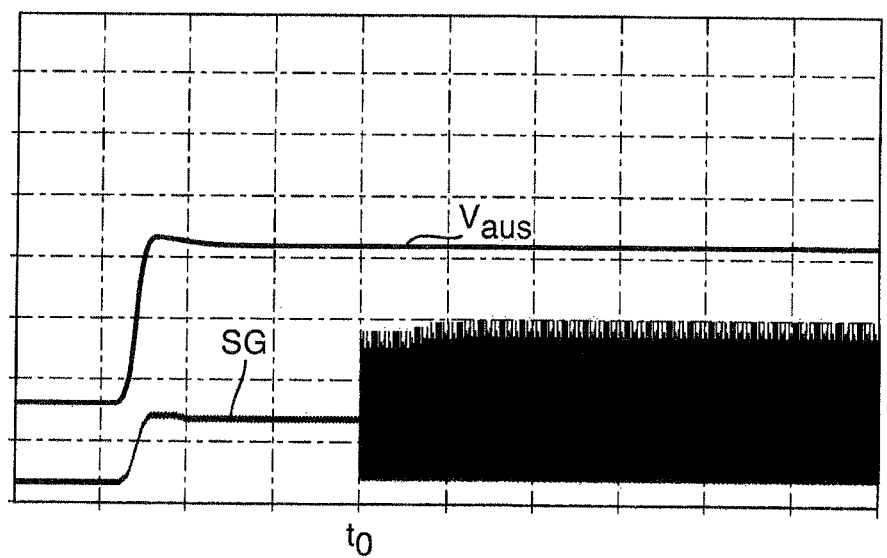
FIG. 3 is a schematic diagram.

A measurement of the output voltage $V_{aus}$ is shown schematically as a diagram in FIG. 3. During the switching from the mode as a linear regulator to the mode as a switching regulator, no jump at time t0 can be seen in the shown scaling under full load. The control voltage $S_G$ at the input of the control element is also shown in FIG. 3.

The need to switch a switching regulator to a linear regulator arises due to the pulse duty ratio, which becomes very large, at a small input to output voltage difference. The invention therefore relates to all switching regulators that must be operated at a small input to output voltage difference or are exposed to high input voltage dynamics, primarily in automotive applications.

The invention is not limited to the shown embodiment variants in FIGS. 1 through 3. It is possible, for example, to provide a different current feedback circuit. It is also possible that the compensation network has differently connected elements and has, for example, PID regulator characteristics. The functionality of the circuit according to FIG. 2 can be used especially advantageously for electronics in an automobile.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A voltage regulator comprising:
 a control element;
 a current feedback circuit;
 a negative voltage feedback circuit; and
 a switch for switching between a first mode as a switching regulator and a second mode as a linear regulator and for generating a digital control signal for triggering the control element in the first mode as a switching regulator based on a sum variable, and for generating a linear control signal for triggering the control element in the second mode as a linear regulator based on the sum variable, wherein, in the first mode as a switching regulator and in the second mode as a linear regulator, a first output of the current feedback circuit and a second output of the negative voltage feedback circuit are coupled to form the sum variable.

2. The voltage regulator according to claim 1, wherein for coupling, the first output of the current feedback circuit and the second output of the negative voltage feedback circuit are connected to a current summing node.

3. The voltage regulator according to claim 2, wherein for coupling, a first output current of the current feedback circuit and a second output current of the negative voltage feedback circuit are summed in the current summing node with an opposite sign.

4. The voltage regulator according to claim 1, wherein a sum variable is a voltage that drops across a resistor, and wherein the resistor is connected to the current summing node.

5. The voltage regulator according to claim 1, wherein the current feedback circuit is formed to generate an output current, which depends on the current through the control element and is proportional to the current through the control element.

6. The voltage regulator according to claim 1, further comprising a compensation network, the compensation network being connected to the negative voltage feedback circuit.

7. The voltage regulator according to claim 6, wherein the compensation network is connected to the current summing node.

8. The voltage regulator according to claim 1, wherein the switch has an amplifier for amplifying the linear control signal and a driver for outputting the digital control signal.

9. The voltage regulator according to claim 8, wherein the amplifier is connected to the driver.

10. The voltage regulator according to claim 1, further comprising a control circuit for triggering the switch to switch between the first mode and the second mode.

11. The voltage regulator according to claim 10, wherein the control circuit is configured in the second mode as a linear regulator to switch the linear control signal via the driver to an input of the control element.

12. The voltage regulator according to claim 1, wherein the switch has a circuit for generating the digital control signal based on the sum variable.

13. A method for switching a voltage regulator between a first mode as a switching regulator and a second mode as a linear regulator, the method comprising:
generating a digital control signal for triggering a control element in the first mode based on a sum variable;
switching between the first mode and the second mode; and
generating a linear control signal for triggering the control element in the second mode as a linear regulator based on the sum variable,
wherein, in the first mode as a switching regulator and in the second mode as a linear regulator, a first output of a current feedback circuit and a second output of a negative voltage feedback circuit are coupled to form the sum variable.

* * * * *